US007004125B2

(12) United States Patent
Asada

(10) Patent No.: US 7,004,125 B2
(45) Date of Patent: Feb. 28, 2006

(54) VALVE TRAIN SYSTEM OF INTERNAL COMBUSTION ENGINE AND CONTROL METHOD THEREOF

(75) Inventor: Toshiaki Asada, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/644,867

(22) Filed: Aug. 21, 2003

(65) Prior Publication Data

US 2004/0045283 A1 Mar. 11, 2004

(30) Foreign Application Priority Data

Sep. 9, 2002 (JP) ............................. 2002-263042

(51) Int. Cl.
F01L 1/34 (2006.01)
(52) U.S. Cl. ............................. 123/90.15; 123/568.14; 123/677; 123/679; 123/687; 123/316; 123/568.11; 60/285
(58) Field of Classification Search ............ 123/90.15, 123/90.16, 58.8, 76, 295, 316, 406.48, 430, 123/435, 436, 447, 448, 451, 531, 532, 536, 123/559.2, 568.11–568.14, 672–677, 679, 123/687, 691, 704; 60/285
See application file for complete search history.

(56) References Cited

U.S. PATENT DOCUMENTS 4,442,809 A * 4/1984 Nohira et al. ............... 123/316
4,461,151 A * 7/1984 Kanesaka ..................... 60/611
5,537,976 A * 7/1996 Hu .............................. 123/322
5,682,854 A * 11/1997 Ozawa ........................ 123/316
6,012,424 A * 1/2000 Meistrick .................... 123/321
6,079,387 A 6/2000 Mamiya et al.
6,318,348 B1 * 11/2001 Xu ......................... 123/568.14
6,321,715 B1 * 11/2001 Dong ......................... 123/295
6,347,619 B1 * 2/2002 Whiting et al. ......... 123/568.12
6,386,177 B1 * 5/2002 Urushihara et al. ......... 123/299
6,736,106 B1 * 5/2004 Reitz et al. .................. 123/316

FOREIGN PATENT DOCUMENTS

| DE | 40 36 537 C1 | 11/1991 |
| DE | 698 26 786 T2 | 2/2005 |
| EP | 1 233 151 B1 | 8/2002 |
| JP | A 3-202603 | 9/1991 |
| JP | A 4-143449 | 5/1992 |
| JP | A 8-200051 | 8/1996 |
| JP | A 2000-45806 | 2/2000 |
| JP | A 2000-186517 | 7/2000 |
| JP | A 2001-107714 | 4/2001 |

* cited by examiner

*Primary Examiner*—Thomas Denion
*Assistant Examiner*—Kyle M. Riddle
(74) *Attorney, Agent, or Firm*—Oliff & Berridge PLC

(57) ABSTRACT

A valve train system for operating an intake valve of an internal combustion engine, in which an operation amount of the intake valve is controlled. When it is determined that there is a need of improving a fuel efficiency by increasing the compression ratio within the combustion chamber on the basis of an engine operating state, an exhaust valve is opened and subsequently closed after an intake stroke until the pressure within the exhaust chamber becomes equal to the pressure within the exhaust passage so as to increase the compression ratio within the exhaust valve.

22 Claims, 7 Drawing Sheets

VALVE TRAIN SYSTEM OF INTERNAL COMBUSTION ENGINE AND CONTROL METHOD THEREOF

INCORPORATION BY REFERENCE

The disclosure of Japanese Patent Application No. 2002-263042 filed on Sep. 9, 2002, including the specification, drawings and abstract are incorporated herein by reference in its entirety.

BACKGROUND OF THE INVENTION

1. Field of Invention

The invention relates to a control of a valve train system of an internal combustion engine.

2. Description of Related Art

An exhaust gas recirculation system of an internal combustion engine is disclosed in Japanese Patent Application Laid-open No. JP-A-4-143449. This exhaust gas recirculation system allows exhaust gas to be admitted into a combustion chamber in an intake stroke. Since the exhaust gas as being inert has a heat absorbing function, the exhaust gas within the combustion chamber decreases the combustion temperature. This makes it possible to suppress generation of $NO_x$ in the combustion chamber. Accordingly, upon admission of the exhaust gas into the combustion chamber in the intake stroke in the exhaust gas recirculation system disclosed as above, generation of $NO_x$ may be suppressed.

The decrease in the combustion temperature of the combustion chamber may reduce the combustion efficiency. Therefore, more quantity of the fuel is required to cause the internal combustion engine to output the required torque.

SUMMARY OF THE INVENTION

It is an object of the invention to improve a fuel efficiency of an internal combustion engine.

In a first aspect of the invention, a valve train system of an internal combustion engine including a lift amount changing mechanism that changes a lift amount of an intake valve, a determining device that determines an existence of an effect of improving a fuel consumption by increasing a compression ratio of a combustion chamber on the basis of an operation state of the internal combustion engine, and a compression ratio increasing device that increases a compression ratio of the combustion chamber by opening and subsequently closing an exhaust valve after an intake stroke until a pressure within the combustion chamber becomes equal to a pressure within an exhaust passage when it is determined that there is the effect of improving the fuel consumption.

In an embodiment described below, an engine speed and a required torque of the embodiment correspond to the operation state of the internal combustion engine.

In a second aspect of the invention, a valve train system of an internal combustion engine, includes a lift amount changing mechanism that changes a lift amount of an intake valve, a determining device that determines an existence of an effect of improving a fuel consumption by admitting exhaust gas in a stratified state into a combustion chamber on the basis of an operation state of the internal combustion engine, and an exhaust gas introducing device that serves to admit the exhaust gas in the stratified state into the combustion chamber when it is determined that there is the effect of improving the fuel consumption.

In an embodiment described below, an engine speed and a required torque of the embodiment correspond to the operation state of the internal combustion engine.

In the second aspect, an exhaust valve may be opened and subsequently closed after an intake stroke until a pressure within the combustion chamber becomes equal to a pressure within an exhaust passage so as to admit the exhaust gas in the stratified state into the combustion chamber.

In a third aspect of the invention, a control method of a valve train system of an internal combustion engine, for changing a lift of an intake valve, comprises the steps of determining an existence of an effect of improving a fuel consumption by increasing a compression ratio of a combustion chamber on the basis of an operation state of the internal combustion engine, and when it is determined that there is the effect of improving the fuel consumption, increasing the compression ratio of the combustion chamber by opening and subsequently closing an exhaust valve after an intake stroke until a pressure within the combustion chamber becomes equal to a pressure within an exhaust passage.

In a fourth aspect of the invention, a control method of a valve train system of an internal combustion engine, for changing a lift amount of an intake valve, comprises the steps of determining an existence of an effect of improving a fuel consumption by admitting exhaust gas in a stratified state into a combustion chamber on the basis of an operation state of the internal combustion engine, and when it is determined that there is the effect of improving the fuel consumption, serving to admit the exhaust gas in the stratified state into the combustion chamber.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
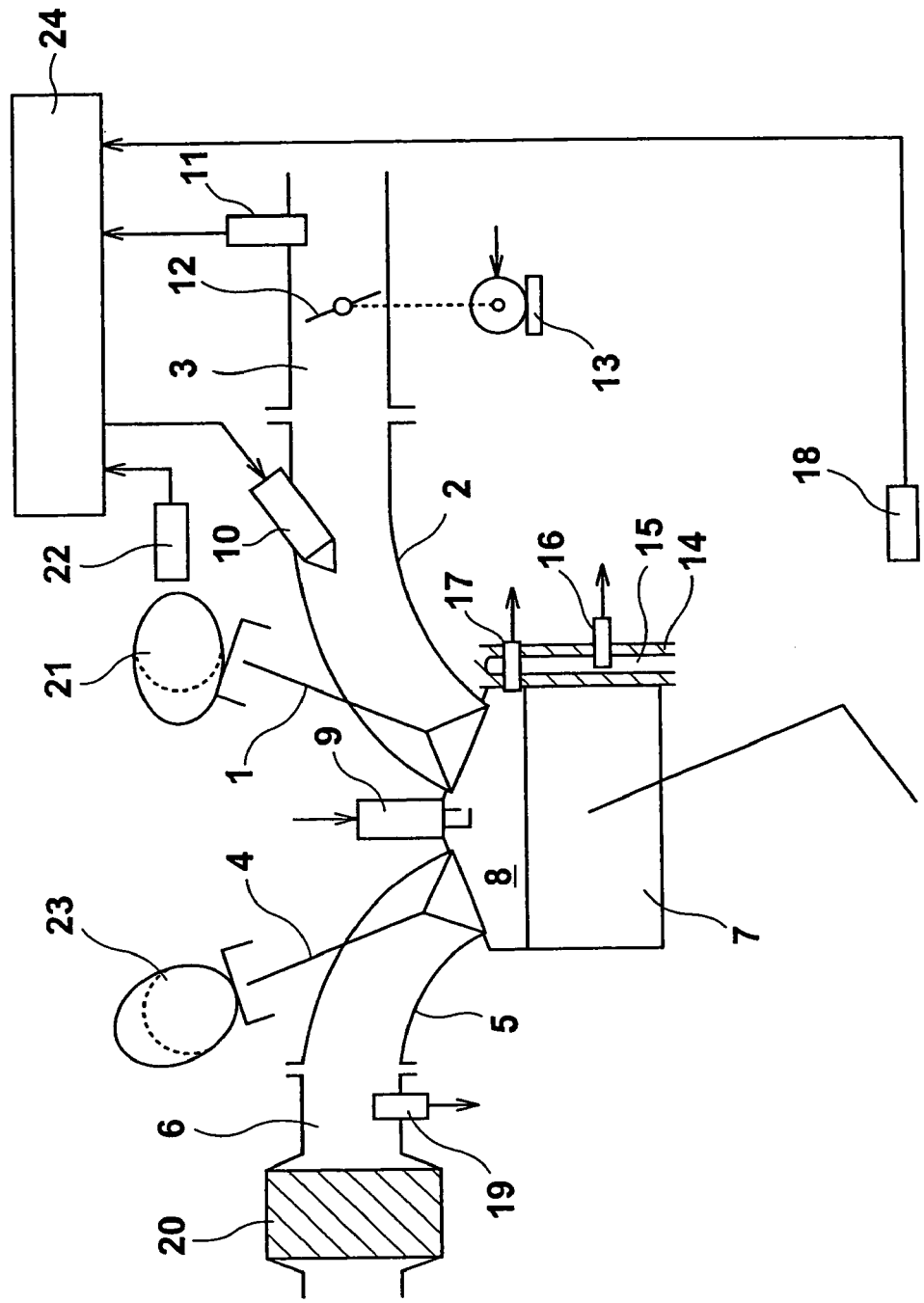
FIG. 1 is a schematic view showing an internal combustion engine having a valve train system according to the invention.

A valve train system of an internal combustion engine according to one embodiment of the present invention will now be described with reference to the attached figures. FIG. 1 schematically represents an internal combustion engine provided with a valve train system of the embodiment, which includes an intake valve 1, an intake port 2, an intake pipe 3, an exhaust valve 4, an exhaust port 5, an exhaust pipe 6, a piston 7, a combustion chamber 8, and a spark plug 9. The intake pipe 3 and the intake port 2 will be hereinafter collectively called as an intake passage, and the exhaust pipe 6 and the exhaust port 5 will also be collectively called as an exhaust passage.

The intake port 2 is provided with a fuel injection valve 10, and the intake pipe 3 is provided with an intake air quantity sensor 11 for detecting quantity of air admitted into the combustion chamber 8. A throttle valve 12 is disposed within the intake pipe 3 downstream of the intake air quantity sensor 11 so as to control the flow rate of the intake air flowing through the intake pipe 3. The throttle valve 12, normally held in a full open state, is connected to a stepping motor 13 so as to be driven thereby.

The internal combustion engine has a cylinder block 14 having a cooling water passage 15 formed therein for allowing cooling water to flow therethrough. The cylinder block 14 is provided with a water temperature sensor 16 for detecting a temperature of the cooling water that flows through the cooling water passage 15. The cylinder block 14 is further provided with an in-cylinder pressure sensor 17 for detecting a pressure within the combustion chamber 8, which will be referred to as an in-cylinder pressure. The internal combustion engine has an engine speed sensor 18 for detecting an engine speed.

The exhaust pipe 6 is provided with an air/fuel ratio sensor 19 for detecting an air/fuel ratio of exhaust gas discharged from the combustion chamber 8. The air/fuel ratio of the exhaust gas is defined as the ratio of the quantity of air admitted into the combustion chamber 8 to the quantity of the fuel injected through the fuel injection valve 10. In the embodiment, the quantity of the fuel injected from the fuel injection valve 10 is controlled such that an air/fuel ratio of air/fuel mixture within the combustion chamber 8 is set to a predetermined air/fuel ratio on the basis of an output of the air/fuel ratio sensor 19.

An exhaust catalyst 20 is disposed within the exhaust pipe 6 downstream of the air/fuel ratio sensor 19 such that a specific content of the exhaust gas is removed.

Figure 2:
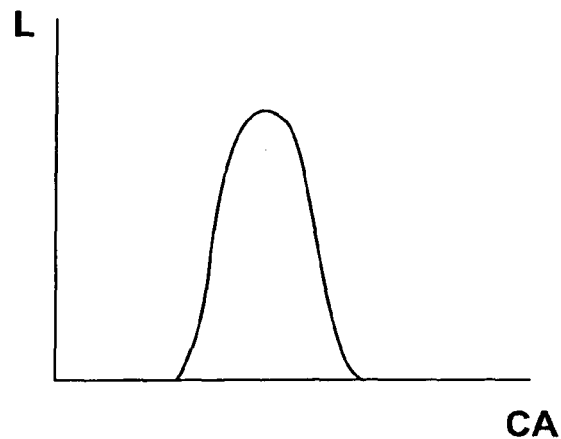
FIG. 2 is a graph representing a lift amount curve of the intake valve.

A valve train system of the internal combustion engine according to the embodiment includes an intake cam 21 for lifting the intake valve 1. The valve train system further includes a mechanism (not shown) of changing a lift amount of the intake valve 1. FIG. 2 is a lift amount curve of the intake valve 1, which is obtained when the lift amount of the intake valve 1 reaches a maximum value. An ordinate axis L and an abscissa axis CA of the curve represent the lift amount of the intake valve 1 and a crank angle, respectively.

The mechanism of changing the lift amount of the intake valve 1 is capable of continuously changing the lift amount between 0 and the maximum value. More particularly, the mechanism is capable of continuously changing the lift amount curve between the curve obtained when the lift amount becomes 0 and the curve obtained when the lift amount becomes maximum. The larger the lift amount of the intake valve 1 becomes, the more the quantity of air admitted into the combustion chamber 8 increases.

The internal combustion engine is provided with a cam position sensor 22 for detecting a rotational phase of the cam with respect to the stroke of the piston 7 in the combustion chamber 8. The valve train system of the embodiment is further provided with an exhaust cam 23 that serves to lift the exhaust valve 4.

The intake air quantity sensor 11, the water temperature sensor 16, the in-cylinder pressure sensor 17, the engine speed sensor 18, the air/fuel ratio sensor 19, and the cam position sensor 22 are connected to an electronic control circuit (ECU) 24 that receives outputs from those respective sensors. The spark plug 9, the stepping motor 13, and the fuel injection valve 10 are also connected to the ECU 24 so as to control the respective operations of those elements.

The throttle valve 12 is normally held in the full open state as described above. The lift amount of the intake valve 1 is adjusted by the mechanism of changing the lift amount so as to control the quantity of air (intake air quantity) admitted into the combustion chamber 8. If the intake air quantity is controlled by adjusting the lift amount of the intake valve 1 while holding the throttle valve 12 in the full open state, the pressure within the intake passage is held at substantially the atmospheric pressure without being decreased to the negative pressure. This makes it possible to reduce the pumping loss caused by the air admitted into the combustion chamber 8. Accordingly, the internal combustion engine is allowed to output the required torque in spite of small quantity of the fuel injected from the fuel injection valve 10.

In the embodiment, the lift amount of the intake valve 1 and the fuel injection quantity are defined by the engine speed and the required torque. If the intake valve 1 is controlled by adjusting its lift amount in the full open state of the throttle valve 12, the fuel injection quantity becomes smaller as a whole. The resultant fuel efficiency of the internal combustion engine, thus, can be improved.

As aforementioned, since the fuel injection quantity becomes relatively smaller in the embodiment, the intake air quantity also becomes relatively smaller. Accordingly a compression ratio within the combustion chamber 8 is reduced. Especially when the required torque is low, and the intake air quantity itself is very small, the compression ratio becomes considerably low.

If the compression ratio of the combustion chamber 8 becomes low, the combustion temperature within the combustion chamber 8 is decreased, and the burning velocity becomes slower. This may deteriorate the combustion efficiency, resulting in deteriorated fuel efficiency of the internal combustion engine. Then, if the intake air quantity is increased, the compression ratio of the combustion chamber 8 is increased. For this, however, the fuel injection quantity has to be increased resulting from the increase in the intake air quantity for maintaining the air/fuel ratio at the predetermined value. The resultant fuel efficiency, thus, is deteriorated.

In the embodiment, the exhaust valve 4 is opened after the intake stroke until the in-cylinder pressure becomes equal to or higher than the pressure within the exhaust passage, more specifically, after the intake stroke until the moment just before the in-cylinder pressure becomes equal to the pressure within the exhaust passage so as to improve the fuel efficiency of the internal combustion engine. When it is determined that there is a possibility of improving the fuel efficiency by increasing the compression ratio of the combustion chamber 8, for example, when the required torque is smaller than a predetermined value, the exhaust valve 4 is opened after the intake stroke until the in-cylinder pressure becomes equal to or higher than the pressure within the exhaust passage, more specifically, after the intake stroke until the moment just before the in-cylinder pressure becomes equal to the pressure within the exhaust passage.

The possibility of improvement in the fuel efficiency by increasing the compression ratio of the combustion chamber 8 may be determined based on such parameters as the required torque, a load rate, the timing for operating the intake valve, and the air/fuel ratio of the air/fuel mixture within the combustion chamber 8. When the internal combustion engine is operated in the state where the air/fuel ratio of the air/fuel mixture within the combustion chamber 8 is substantially high, or in the lean burn state, it is determined that there is a possibility of improving the fuel efficiency by increasing the compression ratio of the combustion chamber 8 as in the case where the required torque is smaller than the predetermined value. If the internal combustion engine is operated in the lean burn state, the combustion temperature within the combustion chamber becomes lower than the combustion temperature within the combustion chamber of the internal combustion engine that is operated at the air/fuel ratio held at the theoretical value. The decreased temperature causes the combustion efficiency to be deteriorated. The fuel efficiency of the internal combustion engine, thus, is deteriorated. According to the embodiment, the possibility of improving the fuel efficiency is determined even if the internal combustion engine is operated in the lean burn state.

A first embodiment of the invention is structured to open the exhaust valve 4 after the intake stroke until the in-cylinder pressure becomes equal to or higher than the atmospheric pressure, more particularly, after the intake stroke until the moment just before the in-cylinder pressure becomes the atmospheric pressure.

Figure 3A:
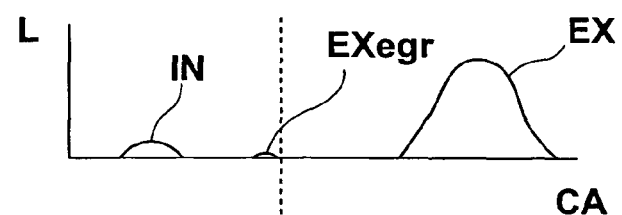
FIGS. 3A and 3B show each graph representing the change in the lift amount of the exhaust valve and the like under a stratified EGR control of the invention, respectively.
Figure 3B:
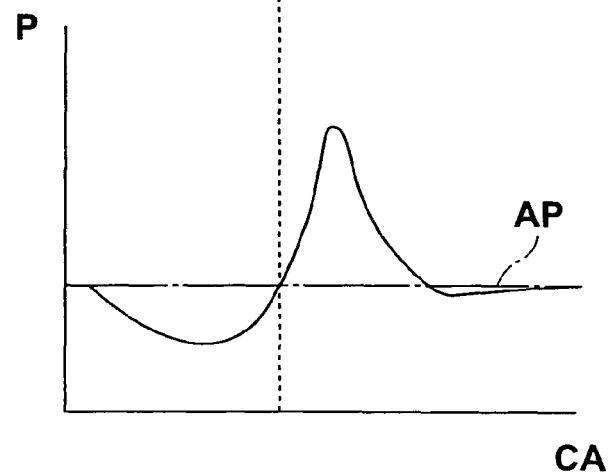

FIGS. 3A and 3B show each graph representing the change in the lift amount of the exhaust valve 4 and the like under the lift control of the exhaust valve 4 in accordance with the first embodiment. In FIG. 3A, an ordinate axis L represents the lift amount of the intake valve 1 or the exhaust valve 4, an abscissa axis CA represents a crank angle, IN represents a lift curve of the intake valve 1, Exegr represents a lift curve of the exhaust valve 4, and EX represents a lift curve of the exhaust valve 4 in the exhaust stroke. In FIG. 3B, an ordinate axis P represents the in-cylinder pressure, an abscissa axis CA represents the crank angle, and AP represents the atmospheric pressure, respectively.

According to the embodiment, the intake valve 1 is lifted in accordance with the lift curve IN as shown in FIG. 3A. Then the intake valve 1 is closed at a point before intake bottom dead center. The exhaust valve 4 is then lifted in accordance with the lift curve Exegr after the intake stroke until the in-cylinder pressure P becomes equal to or higher than the atmospheric pressure AP.

When the exhaust valve 4 is lifted, the in-cylinder pressure is lower than the atmospheric pressure, and the pressure within the exhaust passage is equal to or higher than the atmospheric pressure. Accordingly the exhaust gas within the exhaust passage flows into the combustion chamber 8. The exhaust gas flowing into the combustion chamber 8 is held in the stratified state without diffusing all over the combustion chamber 8. The effect of the exhaust gas as being inert is restrained if it is kept from diffusing all over the combustion chamber 8, thus preventing the decrease in the combustion temperature within the combustion chamber 8. As the exhaust gas flows into the combustion chamber 8, the compression ratio of the combustion chamber 8 increases. So the burning velocity within the combustion chamber 8 is accelerated to increase the combustion efficiency, thus improving the fuel efficiency.

In the embodiment, if it is determined that there is a possibility of improving the fuel efficiency by increasing the compression ratio of the combustion chamber 8, in other words, by admitting the exhaust gas in the stratified state into the combustion chamber 8, the exhaust valve 4 is opened after the intake stroke until the in-cylinder pressure becomes equal to or higher than the pressure within the exhaust passage, especially, after the intake stroke until the moment just before the in-cylinder pressure becomes equal to the pressure within the exhaust passage.

A valve-opening control of the exhaust valve 4 after the intake stroke until the in-cylinder pressure becomes equal to or higher than the pressure within the exhaust passage will be hereinafter referred to as a stratified EGR control.

The higher the engine speed becomes or the larger the required torque becomes, the earlier the in-cylinder pressure becomes equal to the pressure within the exhaust passage. In order to admit the exhaust gas into the combustion chamber 8 under the stratified EGR control as desired, the valve-closing timing of the exhaust valve 4 has to be set in accordance with the engine speed and the required torque such that the exhaust valve 4 is closed before the in-cylinder pressure reaches the pressure within the exhaust passage.

In the embodiment, the valve-closing timing of the exhaust valve 4 under the stratified EGR control is set in accordance with the engine speed and the required torque. More specifically, under the stratified EGR control, the valve-closing timing of the exhaust valve 4 is set earlier as the engine speed becomes higher and the required torque becomes larger. This makes it possible to close the exhaust valve 4 before the in-cylinder pressure reaches the pressure within the exhaust passage under the stratified EGR.

Figure 4A:
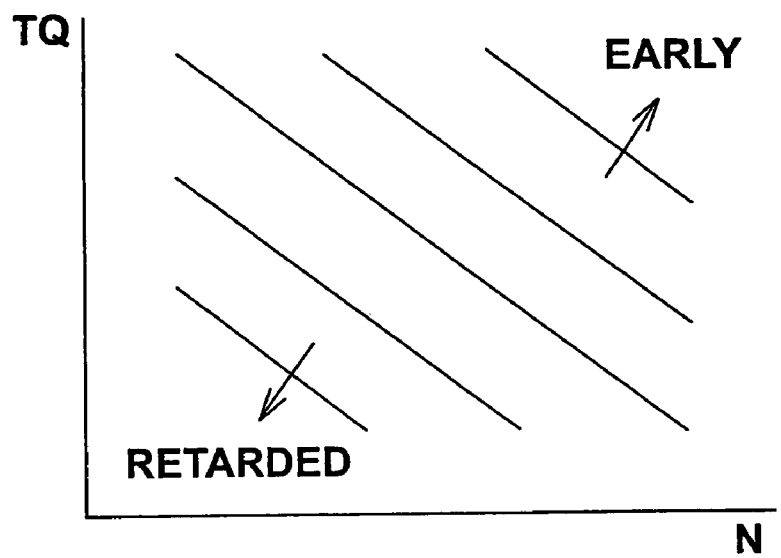
FIGS. 4A and 4B show maps to be referred under the stratified EGR control.

In the embodiment, the valve-closing timing of the exhaust valve 4 under the stratified EGR control is defined by the engine speed N and the required torque TQ, which is stored as a map as shown in FIG. 4A. When the stratified EGR control is executed, the map is referred to set the valve-closing timing of the exhaust valve 4.

The valve-closing timing of the exhaust valve 4 may be set in accordance with the lift amount and a valve-closing timing of the intake valve 1 at a moment just before the valve-opening timing the exhaust valve 4. In this case, the valve-closing timing of the exhaust valve 4 is set earlier as the lift amount of the intake valve 1 becomes larger, or the valve-closing timing of the intake valve 1 is further retarded.

The valve-closing timing of the exhaust valve 4 may be set in accordance with the in-cylinder pressure detected by the in-cylinder pressure sensor 17. In this case, the valve-closing timing of the exhaust valve 4 is set at a moment before the in-cylinder pressure exceeds the pressure within the exhaust passage.

If the stratified EGR control is executed at the high in-cylinder pressure, the rate of increase in the compression ratio within the combustion chamber 8 into which the exhaust gas is admitted is increased. There is, however, the upper limit of the compression ratio in the combustion chamber 8. Therefore, the quantity of the exhaust gas admitted into the combustion chamber 8 under the stratified EGR control has to be set in accordance with the in-cylinder pressure at an initial stage of the stratified EGR control. The in-cylinder pressure becomes higher as the engine speed or the required torque increases.

In the embodiment, the lift amount of the exhaust valve 4 is set in accordance with the engine speed and the required torque under the stratified EGR control. More specifically, in the embodiment, the higher the engine speed becomes, or the larger the required torque becomes, the smaller the lift amount of the exhaust valve 4 is set under the stratified EGR control. This makes it possible to prevent the in-cylinder pressure from exceeding the allowable upper limit under the stratified EGR control.

Figure 4B:
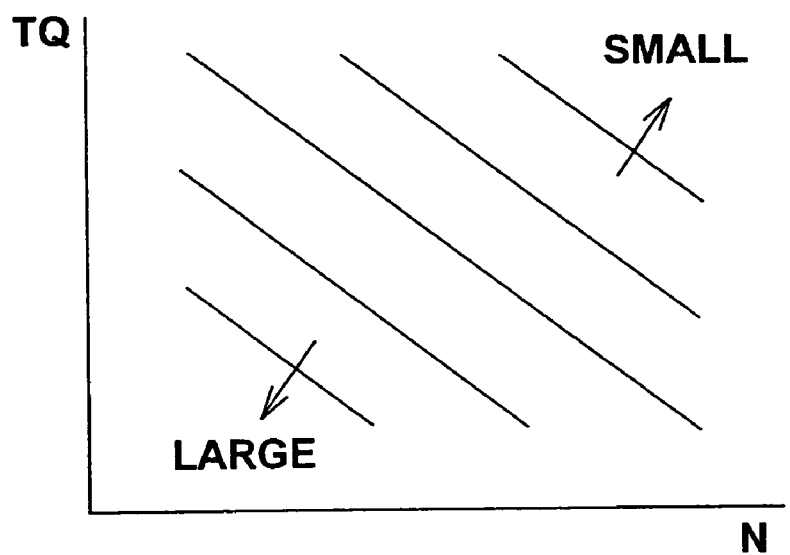

In the embodiment, the lift amount of the exhaust valve 4 under the stratified EGR control is defined by the engine speed N and the required torque TQ so as to be stored as the map shown in FIG. 4B. The stratified EGR control is executed by referring to the map so as to set the lift amount of the exhaust valve 4.

The lift amount of the exhaust valve 4 may be set in accordance with the lift amount and the valve-closing timing of the intake valve 1 obtained at a timing just before the valve-opening timing of the exhaust valve 4. In this case, the lift amount of the exhaust valve 4 is decreased as the lift amount of the intake valve 1 increases, and the valve-closing timing of the intake valve 1 is retarded.

Alternatively the lift amount of the exhaust valve 4 may be set in accordance with the in-cylinder pressure detected by the in-cylinder pressure sensor 17. In this case, the lift amount of the exhaust valve 4 is decreased as the in-cylinder pressure increases.

Figure 5:
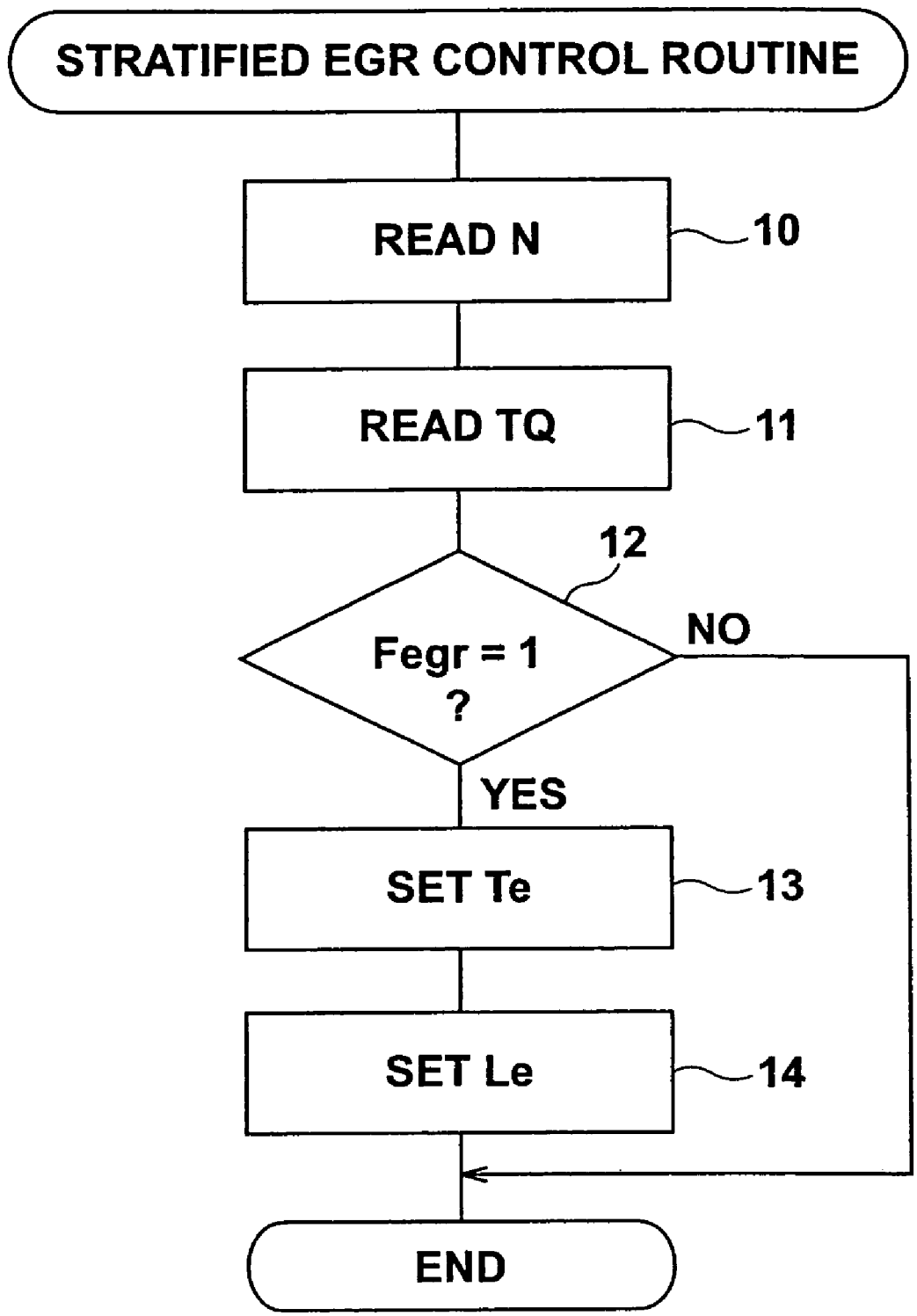
FIG. 5 is a flowchart of an exemplary routine for executing the stratified EGR control.

FIG. 5 is a flowchart of an exemplary routine for executing the stratified EGR control of the embodiment. First in step 10, an input of the engine speed N is read, and in step 11, an input of the required torque TQ is read. Then in step 12, it is determined whether an execution flag Fegr has been set (Fegr=1). The execution flag Fegr is set when it is determined that the exhaust valve 4 is required to be opened after the intake stroke until the in-cylinder pressure becomes equal to or higher than the pressure within the exhaust passage. The execution flag Fegr is reset when it is determined that the exhaust valve 4 is not required to be opened for the aforementioned period.

If YES is obtained in step 12, that is, Fegr=1, the process proceeds to step 13 where the valve-closing timing Te of the exhaust valve 4 is set using the map as shown in FIG. 4A. Then in step 14, the lift amount Le of the exhaust valve 4 is set using the map as shown in FIG. 4B. If NO is obtained in step 12, that is, Fegr=0, the routine ends.

For the purpose of increasing the temperature of the exhaust catalyst 20 by promoting oxidation therein or promoting oxidation of the specific content within the exhaust catalyst 20, there may be a need of supplying oxygen to the exhaust catalyst 20. In the embodiment, when it is determined that supply of oxygen to the exhaust catalyst 20 is required, the exhaust valve 4 is opened at a timing when the in-cylinder pressure exceeds the pressure within the exhaust passage in the compression stroke subsequent to the intake stroke.

Figure 6A:
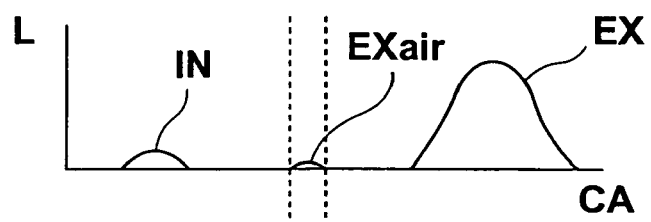
FIGS. 6A and 6B show each graph representing the change in the lift amount of the exhaust valve and the like under an air injection control of the invention.
Figure 6B:
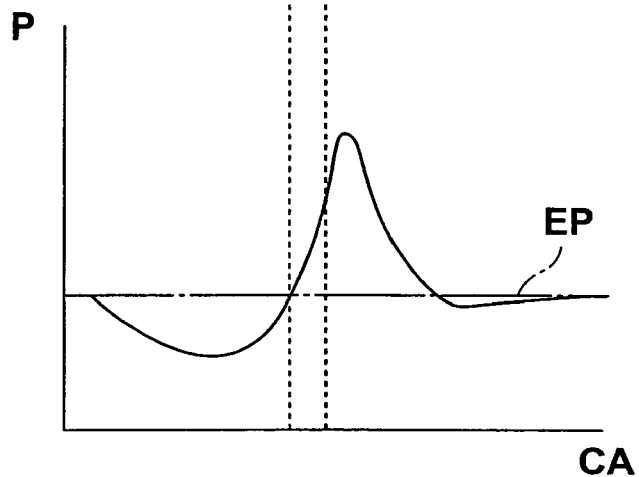

FIGS. 6A and 6B show each graph representing the change in the lift amount of the exhaust valve 4 and the like under the control of lifting the exhaust valve 4. FIGS. 6A and 6B are similar to FIGS. 3A and 3B, respectively. In FIG. 6A, EXair represents a lift curve of the exhaust valve 4. In FIG. 6B, EP represents the pressure within the exhaust passage.

Referring to FIG. 6A, under the control of lifting the exhaust valve 4, the intake valve 1 is lifted in accordance with the lift curve IN in the intake stroke. When the in-cylinder pressure P exceeds the pressure EP within the exhaust passage in the compression stroke subsequent to the intake stroke, the exhaust valve 4 is lifted in accordance with the lift curve EXair. When the exhaust valve 4 is lifted, the in-cylinder pressure has already exceeded the pressure within the exhaust passage. Therefore, air within the combustion chamber 8 flows into the exhaust passage so as to be supplied to the exhaust catalyst 20.

The control for opening the exhaust valve 4 when the in-cylinder pressure exceeds the pressure within the exhaust passage after the intake stroke for supplying oxygen to the exhaust catalyst 20 will be hereinafter referred to as an air injection control.

The timing at which the in-cylinder pressure exceeds the pressure within the exhaust passage may vary depending on the engine speed and the required torque. More specifically, such timing becomes earlier as the engine speed or the required torque increases. The valve-opening timing of the exhaust valve 4 is required to be set in accordance with the engine speed and the required torque such that the exhaust valve 4 is opened at a moment when the in-cylinder pressure just exceeds the pressure within the exhaust passage.

In the embodiment, the valve-opening timing of the exhaust valve 4 is set in accordance with the engine speed and the required torque under the air injection control. More specifically, under the air injection control, the valve-opening timing of the exhaust valve 4 becomes earlier as the engine speed or the required torque increases. Under the air injection control, the exhaust valve 4 may be opened at a moment when the in-cylinder pressure has just exceeded the pressure within the exhaust passage.

Figure 7A:
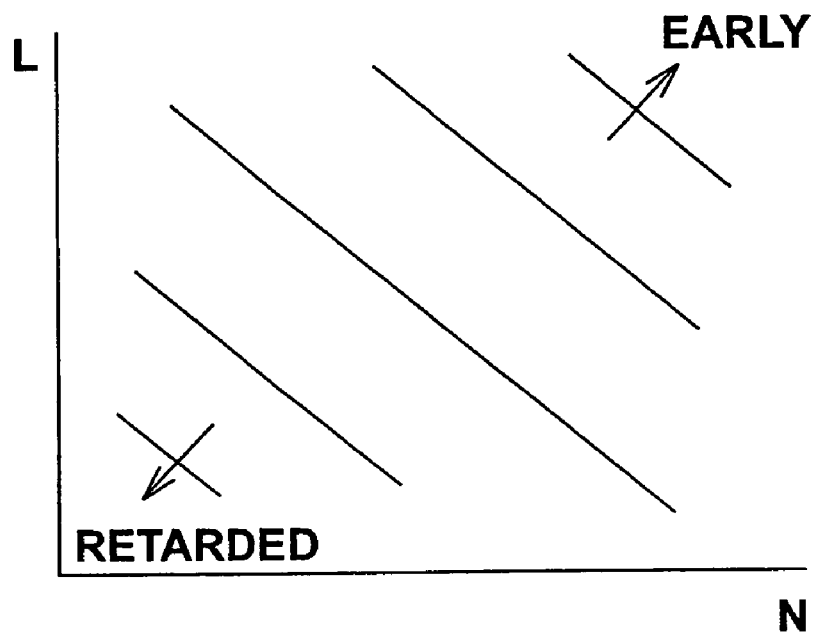
FIGS. 7A and 7B show maps to be referred under the air injection control of the invention.

The valve-opening timing of the exhaust valve 4 under the air injection control is defined by the engine speed N and the required torque TQ, which is formed as a map as shown in FIG. 7A. The map is preliminarily stored so as to be referred for setting the valve-opening timing of the exhaust valve 4. The valve-closing timing of the exhaust valve 4 may also be set as well.

The valve-opening timing and/or the valve-closing timing of the exhaust valve 4 may be set in accordance with the lift amount and the valve-closing timing of the intake valve 1 at a moment just before the valve-opening timing of the exhaust valve 4. In this case, the valve-opening timing and/or the valve-closing timing of the exhaust valve 4 becomes earlier as the lift amount of the intake valve 1 increases and the valve-closing timing of the intake valve 1 retards.

The valve-opening timing and/or the valve-closing timing of the exhaust valve 4 may be set in accordance with the in-cylinder pressure detected by the in-cylinder pressure sensor 17. In this case, the valve-opening timing and/or the valve-closing timing of the exhaust valve 4 is set at a moment after the in-cylinder pressure has exceeded the pressure within the exhaust passage. The valve-opening timing of the exhaust valve 4 is set such that the exhaust valve 4 is opened at a moment after the in-cylinder pressure exceeds the pressure within the exhaust passage.

Large quantity of the exhaust gas discharged from the combustion chamber 8 leads discharge of large quantity of unburned fuel. Therefore, the lift amount of the exhaust valve 4, that is, the quantity of air supplied to the exhaust catalyst 20 under the air injection control is required to be adjusted in accordance with the quantity of the unburned fuel discharged from the combustion chamber 8. This makes it possible to sufficiently oxidize the unburned fuel contained in the exhaust gas.

If the temperature of the exhaust catalyst 20 is substantially high at an initial stage, the temperature range where the temperature of the exhaust catalyst 20 required to be increased to the desired value is reduced. Therefore, the lift amount of the exhaust valve 4 under the air injection control, that is, quantity of air supplied to the exhaust catalyst 20 is required to be adjusted in accordance with the temperature of the exhaust catalyst 20.

In the embodiment, the lift amount of the exhaust valve 4 under the air injection control is set in accordance with the quantity of the exhaust gas discharged from the combustion chamber 8 and the temperature of the exhaust catalyst 20. More specifically, the quantity of the exhaust gas discharged from the combustion chamber 8 may be estimated on the basis of quantity of air (intake air quantity) to be admitted into the combustion chamber 8. The temperature of the exhaust catalyst 20 may be estimated on the basis of the temperature of the cooling water (cooling water temperature) for cooling the internal combustion engine. Therefore, the lift amount of the exhaust valve 4 is set to be larger as the intake air quantity becomes larger. Meanwhile, the lift amount of the exhaust valve 4 is set to be smaller as the cooling water temperature becomes higher. Accordingly under the air injection control, the unburned fuel contained in the exhaust gas is oxidized in the exhaust catalyst 20 so as to be held at the desired temperature.

Figure 7B:
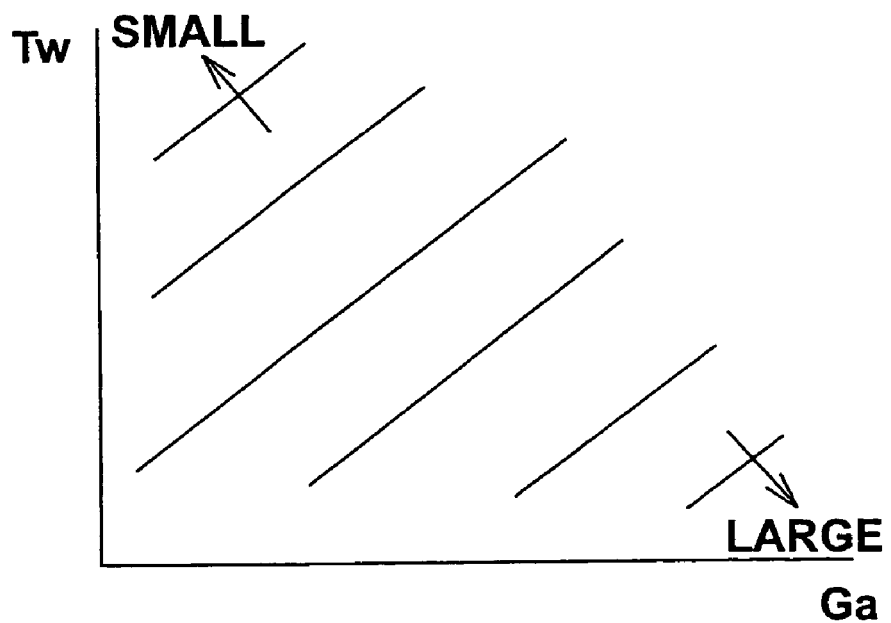

In the embodiment, the lift amount of the exhaust valve 4 under the air injection control is defined by the intake air quantity Ga and the cooling water temperature Tw, which is formed as a map as shown in FIG. 7B. The map is preliminarily stored and referred for setting the lift amount of the exhaust valve 4 under the air injection control.

The lift amount of the exhaust valve 4 may be set in accordance with the engine speed and the required torque. In this case, the lift amount of the exhaust valve 4 becomes larger as the engine speed or the required torque increases.

The lift amount of the exhaust valve 4 may be set in accordance with the lift amount and the valve-closing timing of the intake valve 1 at a timing just before the valve-opening timing of the exhaust valve 4. In this case, the lift amount of the exhaust valve 4 is made smaller as the lift amount of the intake valve 1 increases, or the valve-closing timing of the intake valve 1 is retarded.

The lift amount of the exhaust valve 4 may be set in accordance with the in-cylinder pressure detected by the in-cylinder pressure sensor 17. In this case, the lift amount of the exhaust valve 4 is made smaller as the in-cylinder pressure increases.

Figure 8:
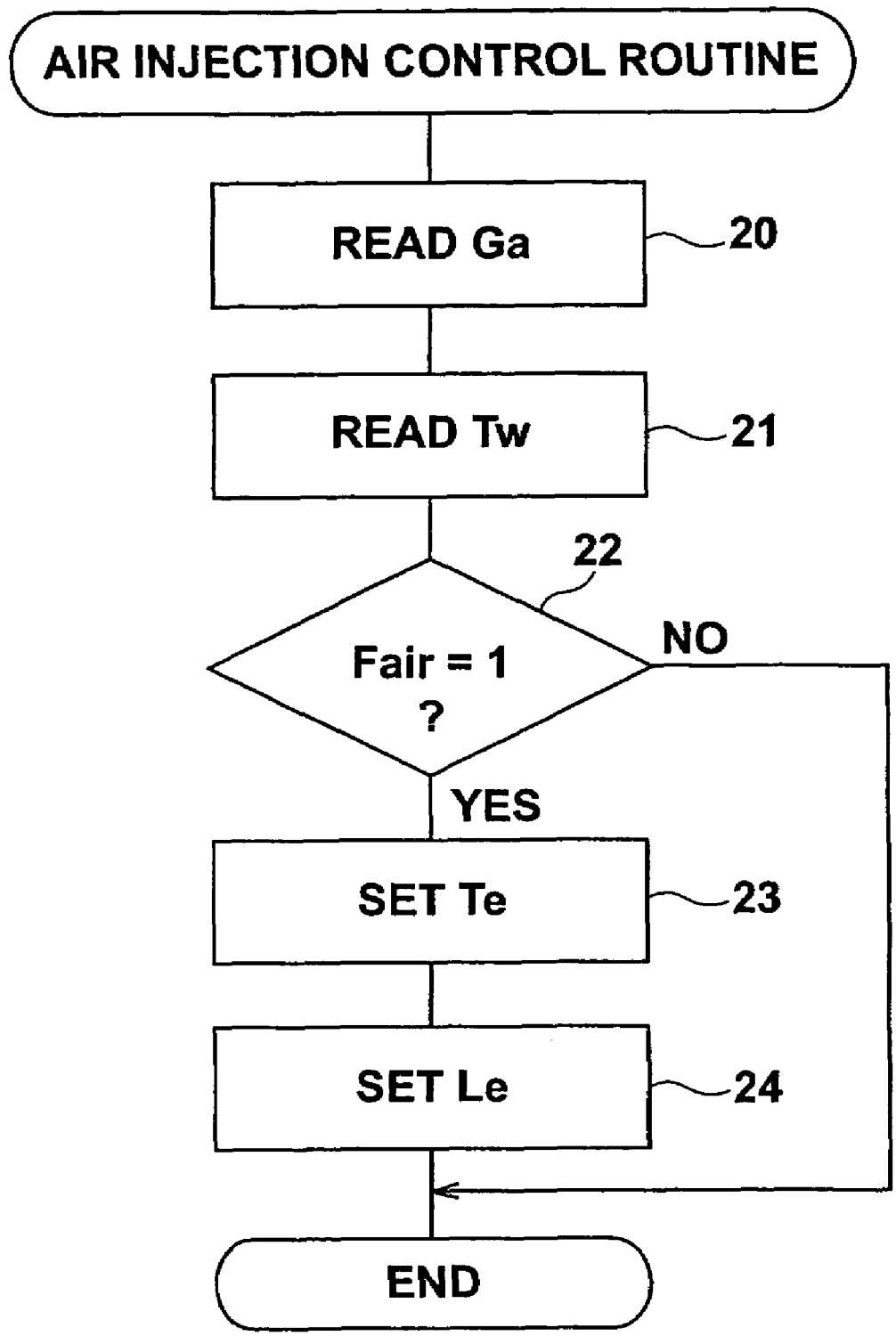
FIG. 8 is a flowchart of an exemplary routine for executing the air injection control of the invention.

FIG. 8 is a flowchart showing an exemplary routine for executing the air injection control. Referring to the flowchart, in step 20, an input of the intake air quantity Ga is read, and in step 21, an input of the cooling water temperature Tw is read. In step 22, it is determined whether an execution flag Fair has been set, that is, Fair=1. The flag Fair is set when it is determined that oxygen is required to be supplied to the exhaust catalyst 20. The flag Fair is reset when it is determined that supply of oxygen to the exhaust catalyst 20 is not required.

If YES is obtained in step 22, that is, Fair=1, the process proceeds to step 23 where the valve-opening timing of the exhaust valve 4 is set using the map as shown in FIG. 7A. Then in step 24, the lift amount of the exhaust valve 4 is set using the map shown in FIG. 7B. If NO is obtained in step 22, that is, Fair=0, the routine ends.

The embodiment makes it possible to improve the fuel efficiency of the internal combustion engine.

What is claimed is:

1. A valve train system of an internal combustion engine, comprising:
a lift amount changing mechanism that changes a lift amount of an intake valve;
a determining device that determines whether it is possible to improve a fuel consumption by increasing a compression ratio of a combustion chamber on the basis of an operation state of the internal combustion engine; and
a compression ratio increasing device that increases a compression ratio of the combustion chamber by, after an intake stroke, opening and subsequently closing an exhaust valve to introduce exhaust gas into the combustion chamber when it is determined that it is possible to improve the fuel consumption.

2. The valve train system according to claim 1, wherein the determining device determines whether it is possible to improve the fuel consumption by increasing the compression ratio of the combustion chamber on the basis of at least one of a required torque, a load rate, an opening-closing timing of the intake valve, and an air-fuel ratio of an air-fuel mixture within the combustion chamber.

3. The valve train system according to claim 1, wherein a valve-closing timing of the exhaust valve is defined by at least one of an engine speed and a required torque, the lift amount and a valve-closing timing of the intake valve at a moment before a valve-opening timing of the exhaust valve, and the pressure within the combustion chamber.

4. The valve train system according to claim 1, wherein a lift amount of the exhaust valve is defined by at least one of an engine speed and a required torque, the lift amount and a valve-closing timing of the intake valve at a moment before the valve-opening timing of the exhaust valve, and the pressure within the combustion chamber.

5. The valve train system according to claim 1, wherein the exhaust gas is introduced into the combustion chamber until a pressure within the combustion chamber becomes equal to a pressure within an exhaust passage.

6. The valve train system according to claim 1, wherein the compression ratio increasing device increases the compression ratio of the combustion chamber by opening and subsequently closing the exhaust valve to introduce the exhaust gas into the combustion chamber after the intake stroke and after air intake into the combustion chamber is completed.

7. A valve train system of an internal combustion engine, comprising:
a lift amount changing mechanism that changes a lift amount of an intake valve;
a determining device that determines whether it is possible to improve a fuel consumption by admitting exhaust gas in a stratified state into a combustion chamber on the basis of an operation state of the internal combustion engine; and
an exhaust gas introducing device that starts admitting the exhaust gas in the stratified state into the combustion chamber after an intake stroke and after air intake into the combustion chamber is completed when it is determined that it is possible to improve the fuel consumption.

8. The valve train system according to claim 7, wherein, after the intake stroke, the exhaust gas introducing device serves to open and subsequently close an exhaust valve until a pressure within the combustion chamber becomes equal to a pressure within an exhaust passage so as to admit the exhaust gas in the stratified state into the combustion chamber.

9. The valve train system according to claim 8, wherein a valve-closing timing of the exhaust valve is defined by at least one of an engine speed and a required torque, the lift amount and a valve-closing timing of the intake valve at a moment before a valve-opening timing of the exhaust valve, and the pressure within the combustion chamber.

10. The valve train system according to claim 8, wherein a lift amount of the exhaust valve is defined by at least one of quantity of the exhaust gas discharged from the combustion chamber and a temperature of an exhaust gas purifying catalyst disposed in the exhaust passage, an engine speed and a required torque, the lift amount and a valve-closing timing of the intake valve at a moment before a valve-opening timing of the exhaust valve, and the pressure within the combustion chamber.

11. The valve train system according to claim 7, wherein the exhaust gas introducing device admits the exhaust gas in the stratified state into the combustion chamber without diffusing the stratified exhaust gas throughout the combustion chamber.

12. A control method of a valve train system of an internal combustion engine, for changing a lift of an intake valve, the control method comprising the steps of:
   determining whether it is possible to improve a fuel consumption by increasing a compression ratio of a combustion chamber on the basis of an operation state of the internal combustion engine; and
   when it is determined that it is possible to improve the fuel consumption, increasing the compression ratio of the combustion chamber by, after an intake stroke, opening and subsequently closing an exhaust valve to introduce exhaust gas into the combustion chamber.

13. The method according to claim 12, wherein the exhaust gas is introduced into the combustion chamber until a pressure within the combustion chamber becomes equal to a pressure within an exhaust passage.

14. The method according to claim 12, wherein the determining step bases its determination on at least one of a required torque, a load rate, an opening-closing timing of the intake valve, and an air-fuel ratio of an air-fuel mixture within the combustion chamber.

15. The method according to claim 12, wherein a valve-closing timing of the exhaust valve is defined by at least one of an engine speed and a required torque, the lift amount and a valve-closing timing of the intake valve at a moment before a valve-opening timing of the exhaust valve, and the pressure within the combustion chamber.

16. The method according to claim 12, wherein a lift amount of the exhaust valve is defined by at least one of an engine speed and a required torque, the lift amount and a valve-closing timing of the intake valve at a moment before the valve-opening timing of the exhaust valve, and the pressure within the combustion chamber.

17. The method according to claim 12, wherein the step of increasing the compression ratio of the combustion chamber includes opening and subsequently closing the exhaust valve to introduce the exhaust gas into the combustion chamber after the intake stroke and after air intake into the combustion chamber is completed.

18. A control method of a valve train system of an internal combustion engine, for changing a lift amount of an intake valve, the control method comprising the steps of:
   determining whether it is possible to improve a fuel consumption by admitting exhaust gas in a stratified state into a combustion chamber on the basis of an operation state of the internal combustion engine; and
   when it is determined that it is possible to improve the fuel consumption, starting to admit the exhaust gas in the stratified state into the combustion chamber after an intake stroke and after air intake into the combustion chamber is completed.

19. The method according to claim 18, wherein the exhaust gas is admitted into the combustion chamber by, after the intake stroke, opening and subsequently closing an exhaust valve until a pressure within the combustion chamber becomes equal to a pressure within an exhaust passage so as to admit the exhaust gas in the stratified state into the combustion chamber.

20. The method according to claim 19, wherein a valve-closing timing of the exhaust valve is defined by at least one of an engine speed and a required torque, the lift amount and a valve-closing timing of the intake valve at a moment before a valve-opening timing of the exhaust valve, and the pressure within the combustion chamber.

21. The method according to claim 19, wherein a lift amount of the exhaust valve is defined by at least one of quantity of the exhaust gas discharged from the combustion chamber and a temperature of an exhaust gas purifying catalyst disposed in the exhaust passage, an engine speed and a required torque, the lift amount and a valve-closing timing of the intake valve at a moment before a valve-opening timing of the exhaust valve, and the pressure within the combustion chamber.

22. The method according to claim 18, wherein the exhaust gas is admitted in the stratified state into the combustion chamber without diffusing the stratified exhaust gas throughout the combustion chamber.

* * * * *